United States Patent [19]

Amouroux et al.

[11] 4,267,027

[45] May 12, 1981

[54] PROCESS AND APPARATUS FOR THE PREPARATION OF NITROGEN OXIDES

[75] Inventors: Jacques Amouroux, Bure S. Yvette; Demetre Rapakoulias; Simeon Cavadias, both of Paris, all of France

[73] Assignee: Electricite de France (Service National), Paris, France

[21] Appl. No.: 131,427

[22] Filed: Mar. 18, 1980

[30] Foreign Application Priority Data

Mar. 21, 1979 [FR] France ................................. 7907142

[51] Int. Cl.³ ..................... C01B 21/20; C01B 21/30; C01B 21/32
[52] U.S. Cl. ................................... 204/179; 423/402; 423/405
[58] Field of Search ................. 204/179; 423/402, 405

[56] References Cited

U.S. PATENT DOCUMENTS

| | | | |
|---|---|---|---|
| 1,134,583 | 4/1915 | Bradley | 204/179 |
| 1,266,717 | 5/1918 | Rossi | 204/179 |
| 3,666,408 | 5/1972 | Grosse et al. | 423/405 |
| 4,073,866 | 2/1978 | Yamaki et al. | 423/405 |
| 4,141,715 | 2/1979 | Wyse et al. | 71/58 |

FOREIGN PATENT DOCUMENTS

| | | | |
|---|---|---|---|
| 41946 | 4/1910 | Austria | 204/179 |
| 1250764 | 12/1960 | France . | |
| 2213232 | 8/1974 | France . | |
| 141011 | 7/1930 | Switzerland . | |
| 269501 | 11/1950 | Switzerland . | |
| 1149858 | 4/1969 | United Kingdom . | |

Primary Examiner—F. C. Edmundson
Attorney, Agent, or Firm—Fleit & Jacobson

[57] ABSTRACT

The present invention relates to a process for the preparation of nitrogen oxides (NO and $NO_2$) by the reaction of nitrogen and oxygen in a plasma furnace.

According to this process, a plasma of oxygen and nitrogen is introduced into the reaction chamber of the plasma furnace, whereof the internal surface of the walls is covered with a catalyst chosen from tungsten trioxide ($WO_3$) and molybdenum trioxide ($MoO_3$).

12 Claims, 3 Drawing Figures

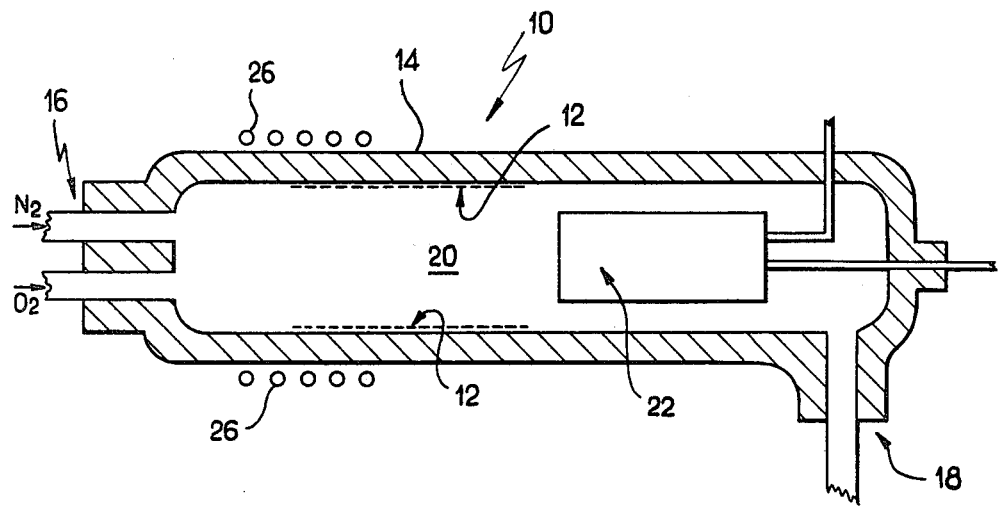
FIG_1
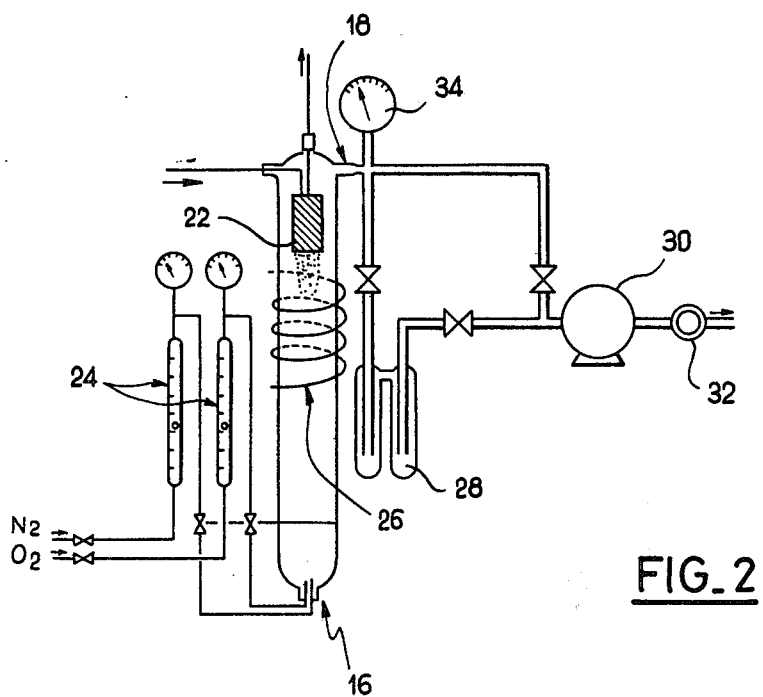
FIG_2

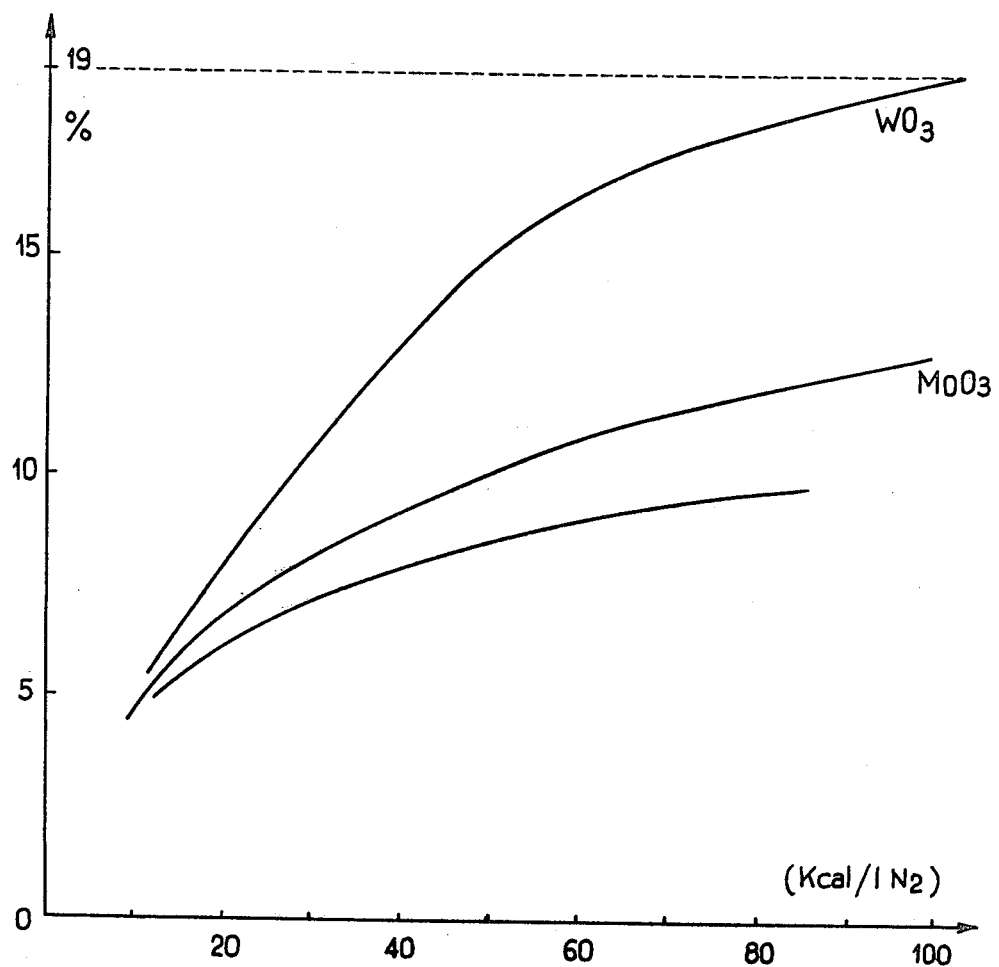
FIG_3

PROCESS AND APPARATUS FOR THE PREPARATION OF NITROGEN OXIDES

The present invention relates to a process for the preparation of nitrogen oxides (NO and $NO_2$) by the reaction of nitrogen and oxygen in a plasma furnace of the type comprising a plasma torch, a reaction chamber and quenching means intended to provide rapid cooling of the gases produced.

The present invention also relates to a plasma furnace intended for implementing a process of this type.

It was proposed long ago to effect the synthesis of nitrogen oxides using plasma. Thus, the Birkeland and Eyde process consisted of passing an electric arc between two electrodes placed in an oxygen-rich air stream. A process of this type resulted in a very low proportion of nitrogen oxide, of the order of 1%, after cooling of the outlet gases.

More recent works have placed greater emphasis on the physical/chemical conditions of the discharge, for example the pressure, the exact composition of the mixture and the working temperature. Under such optimum operating conditions, only 8–10% of the nitrogen introduced can be converted into nitrogen oxides (NO and $NO_2$).

On the other hand, the present invention relates to a catalytic process in the heterogeneous phase making it possible to considerably increase the yield of the rate of fixation of nitrogen with respect to processes of the prior art. According to this method, a plasma of oxygen and nitrogen is introduced into the reaction chamber of the plasma furnace, whereof the inner surface of the walls is covered with a catalyst chosen from tungsten trioxide ($WO_3$) and molybdenum trioxide ($MoO_3$).

The present invention also relates to a plasma furnace of the type comprising a plasma torch, a reaction chamber and quenching means, which is intended to carry out a process of this type. The plasma furnace according to the invention is characterised in that it is of the type having laminar flow and that the surface of the reaction chamber, which supports the catalyst and which comes into contact with the reaction gases, is large with respect to the gas stream.

Further features and advantages of the process according to the present invention will become apparent on reading the detailed description given hereafter and referring to the accompanying drawings in which:

FIG. 1 is a diagram illustrating the principle of the plasma furnace intended for carrying out the process of the invention;

FIG. 2 is a diagram of the installation for carrying out the process of the invention and FIG. 3 is a diagram of the rate of fixation of nitrogen as a function of the energy induced.

In the accompanying FIGS. 1 and 2, identical parts will be designated by the same reference numerals.

According to the present invention, the preparation of nitrogen oxides (NO and $NO_2$) is carried out by the reaction of nitrogen and oxygen in a plasma furnace 10 of the type comprising a plasma torch, a reaction chamber and quenching means intended to provide rapid cooling of the gases produced.

It will be recalled that the plasma is a mixture of electrically neutral molecules of gas and of molecules dissociated to give positive ions and electrons. The molecular dissociation of nitrogen and oxygen supplied to the plasma furnace take place precisely in the vicinity of the plasma torch, as does the high temperature heating.

According to the process of the invention, one preferably uses a plasma torch of the H.F. induction type, i.e. the nozzle of the plasma torch is disposed in a high frequency electro-magnetic field (for example 40 Megahertz). A device of this type without electrodes has facilitated greater understanding of the respective role of the reactions in the homogeneous phase, i.e. within the stream of gas and of the reactions in a heterogeneous phase, i.e. on the wall. Various experiments which have been carried out have shown that reactions in the heterogeneous phase in fact play a determining part in the synthesis of nitrogen oxides. It has also been shown that catalysts, preferably chosen from tungsten trioxide ($WO_3$) and molybdenum trioxide ($MoO_3$), are able to modify the yields considerably, in the case where the contact between plasma and wall is considerable.

Oxides of this type having a high melting point, 700° for $MoO_3$ and 1500° C. for $WO_3$, are deposited on supports having a large surface area, of a refractory nature such as for example $Al_2O_3$, MgO, $ZrO_2$ or similar oxides.

In view of the fact that it has seemed important that the contact surface between the reaction gases and the catalyst supports is as large as possible, it may be advantageous to apply said catalyst to the walls of the reaction chamber or even to traditional catalyst supports.

The deposition of the catalyst 12 on the walls 14 of the reaction chamber and/or possibly on additional supports may advantageously be carried out by direct combustion of tungsten and/or molybdenum in an oxygen plasma.

EXAMPLE DESCRIBING HOW THE PROCESS OF THE INVENTION IS CARRIED OUT

The plasma may be produced in a silica reactor having a diameter of 10 cm and a length of 20 cm. A mixture of nitrogen and oxygen is introduced into the inlet 16 of the plasma furnace, which mixture may possibly be constituted by a stream of oxygen-rich air and located in the vicinity of the other end of the furnace is a quenching device which fixes the gaseous mixture before it leaves the reactor at 18.

The wall 14 of the reaction chamber is covered with tungsten oxide and/or molybdenum oxide and the plasma flows at least partly against the wall 14. In tests which have been carried out, it is apparent that the wall plays an important part, in view of the fact that for a surface of 860 $cm^2$, one observes for example an increase of 100% of the rate of nitrogen oxide (NO) formed, with respect to tests carried out without a catalyst (see the diagram of FIG. 3). It is thus apparent that the synthesis of NO by catalytic processes in the heterogeneous phase was able to modify considerably the yield of the rate of fixation of nitrogen and consequently the industrial applications of this process, amongst which one should mention the preparation of nitric acid.

In experiments carried out as non-limiting examples, the results of which have been given in the diagram of FIG. 3, the pressure prevailing in the reaction chamber 20 was of the order of 10–760 mm of Mercury. In view of the fact that the reactor 10 is not in equilibrium, it is in fact necessary to consider three different temperatures, namely an electronic temperature substantially comprised between 1 and 5 eV, a vibrational temperature substantially comprised between 5000° and 12000°

K. and a rotation/translation temperature substantially comprised between 1000° and 8000° K. Under such reaction conditions, the temperature of the wall 14 of the reaction chamber 20 is substantially of the order of 400°–1500° K., whereas the temperature of the quenching head 22 of the quenching means is always kept close to ambient temperature, for example by the circulation of cooling water.

In the reaction products, it has been possible to identify the presence of $NO_2$, nitrogen and oxygen. The quantity of $NO_2$ present in the final products varies from 5–10% by volume depending on the experimental conditions. As regards the quantity of $N_2$ and $O_2$, it depends on the initial composition of the mixture supplied to the furnace 10. Thus, the composition of the gaseous mixture at the inlet and outlet of the plasma furnace 10 will be given hereafter by way of example.

EXAMPLE OF COMPOSITION

|  | at the inlet of the furnace | at the outlet of the furnace |
|---|---|---|
| $NO_2$ | 0 | 0.2 l/min |
| $N_2$ | 0.9 l/min | 0.82 l/min |
| $O_2$ | 1.1 l/min | 0.93 l/min |

In this particular example given in the above table, the percentage of $NO_2$ at the outlet of the reactor is 10% by volume and the rate of fixation of nitrogen is 11%.

Naturally, according to an additional feature of the present invention, from the mixture of gaseous reaction products obtained, it is advantageously possible to separate and dry the oxygen and nitrogen recovered at the outlet of the plasma furnace, for the purpose of recycling them in said furnace.

Industrially, it has been possible to identify nitrogen dioxide. It is thus necessary to provide a separation of $NO_2$ on the one hand and the mixture of nitrogen and oxygen on the other hand. Nitrogen dioxide may advantageously be absorbed in water for example to produce nitric acid and the escaping gases (i.e. oxygen and nitrogen) are recycled in the reactor after drying.

In the diagram of FIG. 3 which illustrates the rate of fixation of nitrogen as a percentage and as a function of the energy induced in the reaction mixture, a considerable difference is apparent in the yield of nitrogen oxide as a function of the nature of the walls 14 of the reaction chamber, according to whether they are not covered with catalysts 12 or whether they are covered with molybdenum trioxide or tungsten trioxide. For an induced energy of 80 Kcal per liter of nitrogen, the proportion of nitrogen fixed, expressed as a percentage, passes from 9.5% to 19% for a wall covered with tungsten trioxide.

The diagram of FIG. 2 again shows the plasma furnace 10 as illustrated in FIG. 1. An installation of this type may advantageously comprise for example, upstream of the furnace 10, flow-meters 24 making it possible to regulate the precise proportion of oxygen and nitrogen in the gasious mixture supplied to the plasma furnace 10. The region corresponding to the plasma torch and the beginning of the reaction chamber 20 are surrounded by self-induction coils 26 through which a high frequency current flows, for example of the order of 40 Megahertz. The installation mounted downstream of the plasma furnace according to the invention may advantageously comprise ordinary temperature traps 28, a primary pump 30 comprising a vane, a gas meter 32 (Gallup) and a pressure gauge 34 comprising a diaphragm which is mounted on a T-connection.

Naturally, the present invention is not limited to the particular embodiments described, but it is quite possible to imagine a certain number of variations, without diverging from the scope of the present invention.

What is claimed is:

1. Process for the preparation of nitrogen oxides (NO and $NO_2$) by the reaction of nitrogen and oxygen in a plasma furnace of the type comprising a plasma torch, a reaction chamber and a quenching device, wherein an oxygen and nitrogen plasma is introduced into said reaction chamber, whereof the inner surface of the walls is covered with a catalyst of tungsten trioxide ($WO_3$) and/or molybdenum trioxide ($MoO_3$), and a mixture of gaseous reaction products rich in nitrogen oxides (NO and $NO_2$) is recovered from the region of the quenching device.

2. Process according to claim 1 wherein said catalyst is at least partially deposited on a refractory support having a high surface area.

3. Process according to claim 2 wherein the refractory support is selected from the group consisting of $Al_2O_3$, MgO and $ZrO_2$.

4. Process according to claim 1 wherein the deposition of said catalyst on the walls of the reaction chamber is effected by combustion of tungsten and/or molybdenum in a plasma of oxygen.

5. Process according to claim 2 wherein said at least partial deposition of said catalyst on the refractory support is effected by combustion of tungsten and/or molybdenum in a plasma of oxygen.

6. Process according to claim 1, wherein the electronic temperature of the plasma of oxygen and nitrogen is of the order of 1 to 5 eV.

7. Process according to claim 1, wherein the vibrational temperature of the plasma of oxygen and nitrogen is of the order of 5000–12000 K.

8. Process according to claim 1, wherein the rotation/translation temperature of the plasma of oxygen and nitrogen is of the order of 1000–8000 K.

9. Process according to claim 1, wherein the temperature of the walls of the reaction chamber is of the order of 400–1500 K.

10. Process according to claim 1, wherein the temperature of the quenching device is kept close to ambient temperature.

11. Process according to claim 1, wherein the pressure prevailing in the reaction chamber is of the order of 10–760 mm of Mercury.

12. Process according to claim 1, wherein oxygen and nitrogen are separated from the gaseous reaction product, the separated oxygen and nitrogen are dried and are recycled to the furnace.

* * * * *